Oct. 2, 1956 F. V. ATKESON 2,764,848

IMPROVED GLASS CUTTING METHOD

Filed Oct. 17, 1952

AQUEOUS SOLUTION of WETTING AGENT

INVENTOR.
FLORIAN V. ATKESON.

BY Oscar L. Spencer
ATTORNEY

United States Patent Office 2,764,848

Patented Oct. 2, 1956

2,764,848

IMPROVED GLASS CUTTING METHOD

Florian V. Atkeson, Tarentum, Pa., assignor to Pittsburgh Plate Glass Company, Allegheny County, Pa., a corporation of Pennsylvania Application October 17, 1952, Serial No. 315,254

4 Claims. (Cl. 49—77)

This invention relates to a novel glass cut running method utilizing various solutions that assist in the running of the cut and is particularly concerned with those types of solutions which may be used in conjunction with glass cutting and running implements to increase the efficiency thereof.

In the cutting of glass sheets to form a plurality of glass pieces from a single glass sheet, it has been known that unless the cut running operation is performed immediately following the scoring operation in the conventional glass cutting process, that the edges of the glass adjacent the score tend to heal and that a greater tensioning force is required to open the cut after a time interval has elapsed than immediately thereafter. It has been discovered that application of water soluble wetting agents to the bottom of the score in the cut glass enables the cutting operation to be performed with less tensioning force. Water is particularly effective as a wetting agent on glass. However, in most cases where an attempt was made to apply water to the surface adjacent to a score line of glass being cut, it was observed that failure resulted. The failures have been explained by the presence of an oil film on the score line due to the passage of oil from the glass cutter during the scoring operation. The presence of this oil film on the score line prevents water penetration to the bottom of the score line.

Accordingly, it is an object of the present invention to provide a more efficient glass cutting operation than the present conventional glass cutting practice.

Another object of the present invention is to perform the glass running operation with a minimum of pressure applied to the glass.

Another object of the present invention is to provide a method of cutting glass wherein the amount of rejects of glass due to undue pressure being applied in the cut running operation is minimized.

These and other objects will become apparent upon a study of the following disclosure taken in connection with the accompanying drawing.

Figure 1:
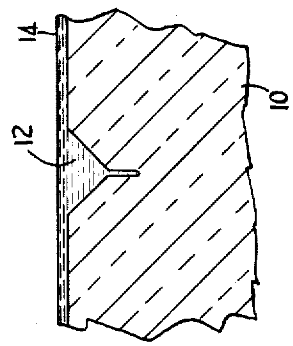
Fig. 1 represents an enlarged schematic cross sectional view of a sheet of glass in the vicinity of a score line wherein the sheet is treated according to the concept contained in the present invention.

In Fig. 1 is schematically disclosed a portion of a sheet of glass 10 containing a longitudinal score line 12 extending longitudinally into the paper. On the scored surface of the glass at the score, there is applied a layer of a water solution 14. This solution contains a very dilute proportion (0.1 to 1.0%) of any one of the family of water soluble surface agents known as wetting agents, such as sulphated higher alcohols, such as sulfated cetyl alcohols, organic acid esters and other like substances.

A few example of certain typical substances that can be utilized as surface active agents include such water soluble materials as alkyl aryl sulfonates, isopropyl naphthalene sodium sulfonate, diisobutyl sodium sulfosuccinate, N-octadecyl disodium sulfosuccinamate, N-octadecyl tetrasodium (1,2-dicarboxyl ethyl sulfosuccinamate), sodium alkyl naphthalene sulfonates, aliphatic ester sulfate, sulfated fatty amines, sodium tetrahydronaphthalene sulfonate, sodium alkyl sulfonates, sulfonates of long chain alcohols, ammonium salts of alkyl aryl sulfonates, fatty amide sulfates, alkyl sulfates from higher fatty alcohols; also alkyl sulfates containing from about 12 to about 16 carbon atoms, fatty acid esters, low molecular weight ethylene oxide condensates, polyglycol ester, diamyl ester of sulfosuccinic acid, dihexyl or dioctyl ester of sodium sulfosuccinic acid, ethylene oxide fatty acid condensate, glycerol monostearate, complex methyl esters of high molecular weight, organic cetyl halides, and amine salts of long chain acids.

This list is by no means complete, but merely indicative of the type of agents required to cause a lowering of the surface tension of water, thereby enabling the latter to penetrate to the bottom of the crack formed in a glass surface by scoring and thus assisting in the opening of the cut. Some of these substances are sold commercially under the trade name of Orvus, Tide, Braunco, Aerosol, etc.

It has been found that by applying the dilute solution of water containing any of the water soluble wetting agents described hereinabove to glass scored by a cutter in the conventional manner, considerably less force is required to open the cut than if no solution at all is applied. The solution may be applied to the score produced in the glass by a glass cutting implement either by a brush or a cotton swab inundated in solution. The improved results are obtained by utilizing the wetting agent despite the fact that cutting oil is present on the cutter and a portion of this oil is removed from the cutter to the scored glass surface during the cutting operation. In cases where a solution of the type described was used, the cut obtained showed smoother edges, no flares, and no shatter shadows.

Figure 2:
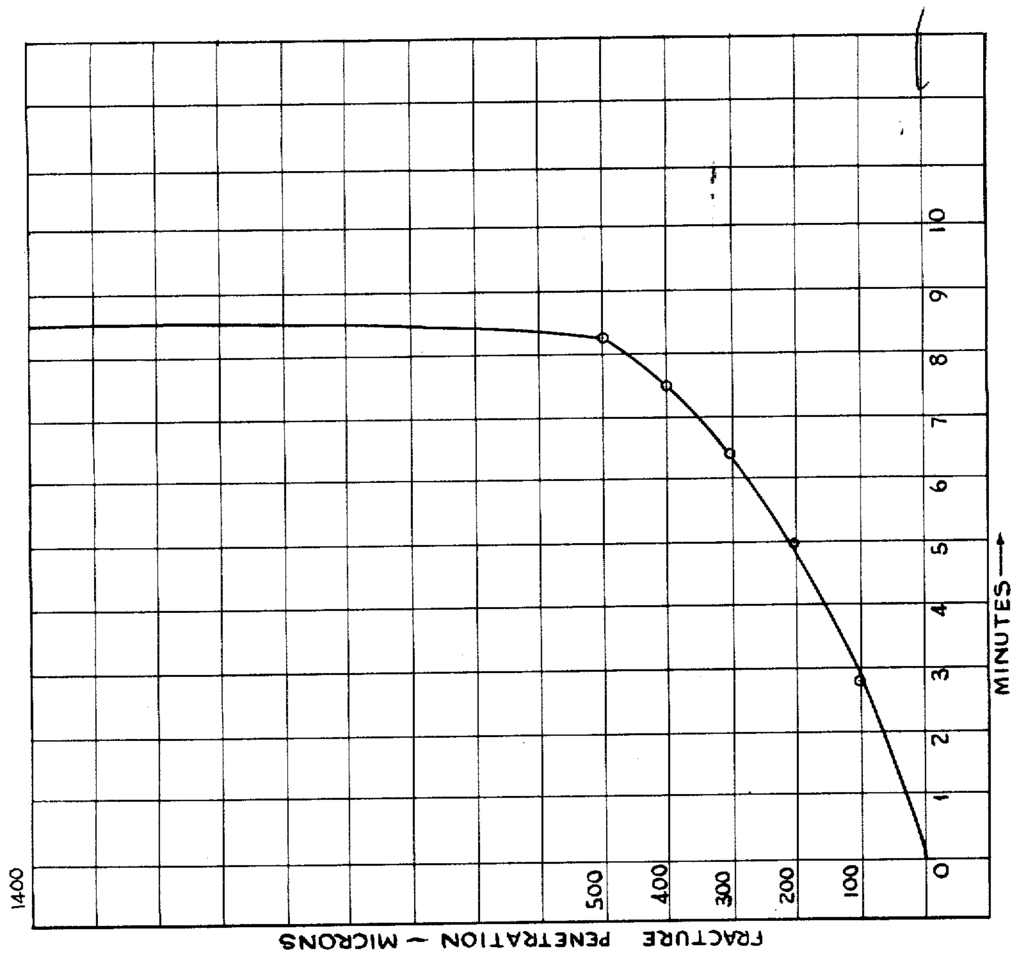
Fig. 2 is a diagram showing the improved results obtained by utilizing the teaching of the present invention compared to the conventional processes formerly used.

Another example of the improved efficiency obtained from utilizing the teachings of the present invention is disclosed diagrammatically in Fig. 2. In this figure, time is plotted against fracture penetration. A glass sheet was longitudinally scored by a conventional cutter and a filar microscope was zeroed at the bottom of the score line. The glass sheet was balanced upon a fulcrum directly beneath the score line and a constant tension was placed on the upper surface of the glass sheet on either side of the score line. The deepening of the cut due to the moments of force caused by the weights applied to the upper surface of the glass sheet were observed and stop watch readings were made to indicate the times the fracture penetrated 100, 200, 300, 400 and 500 microns, without treating the surface of the scored glass. As soon as the fracture had penetrated 500 microns a water solution containing 1% Orvus (a sodium salt of technical lauryl sulfate) was applied to the upper glass surface in the vicinity of the score line. It was observed that it took over 8 minutes for the fracture to penetrate 500 microns before application of the surface active solution, whereas the application of the detergent caused the fracture to penetrate twice as deep in a matter of about 12 seconds.

Another experiment demonstrates the increased efficiency in cutting glass obtained with the use of surface active solutions. The surface of a glass sheet was scored by conventional means and an opening moment was produced by applying a pair of weights on both sides of the score and balancing the sheet and weight upon a knife edge. Various specimens of glass were allowed to stand in equilibrium with no appreciable deepening of the score line for period ranging from 15 seconds to 16 hours. At the end of the various periods, upon application of a 1% water solution containing a surface active agent, the glass sheet almost immediately snapped into two pieces. The cut edges were characteristically smooth and free from flare and shatter shadows.

In practical application the following sequence of operations has been found to be most efficient: Glass is scored along the desired cut line by means of any of the usual scoring tools such as a steel wheel cutter, a carbide wheel cutter, or a fixed diamond. Cuts may be made either dry or with oil. A wetting solution is then applied by brush, swab, spray, etc. along the score line and opening tension (normal cut opening procedure) immediately applied. Minimum time between application of the cut-running solution and opening should be sought inasmuch as the solution not only weakens the glass at the opening fracture but also accelerates the healing action. However, the results obtained when the opening is made shortly after the cut-running solution is applied are remarkable as described hereinabove.

While certain specific embodiments of the above identified invention has been disclosed, it is understood that the scope of the invention is not to be limited to the scope of the enclosed disclosure, reference to the breadth of the invention being had only by means of the appended claims.

What is claimed is:

1. In a method of cutting glass comprising scoring a line along a surface of a glass sheet and opening the score line, the improvement comprising applying a dilute aqueous solution of a water soluble wetting agent to the score line in the glass surface just prior to the opening operation.

2. A method of cutting glass comprising scoring a surface of a glass sheet, applying a dilute aqueous solution of a water soluble wetting agent to the score in the glass surface and opening the score shortly after the application of the solution by the application of a tensioning pressure on opposite sides of the score.

3. A method of cutting glass comprising imparting oil to a surface of a glass sheet, scoring the surface with a cutting wheel, applying an aqueous solution containing a water soluble wetting agent to the glass surface in the score, and shortly thereafter opening the score by the application of a tensioning pressure on opposite sides of the score.

4. The method of claim 1 wherein the water soluble wetting agent is sodium lauryl sulfate.

References Cited in the file of this patent

UNITED STATES PATENTS 989,603 Horning ---------- Apr. 18, 1911
2,470,444 Philippe ---------- May 17, 1949

Dedication 2,764,848.—*Florian V. Atkeson*, Tarentum, Pa. IMPROVED GLASS CUTTING METHOD. Patent dated Oct. 2, 1956. Dedication filed July 25, 1973, by the assignee, *PPG Industries, Inc.*

Hereby dedicates the remainder of its term to the free use and benefit of the People of the United States.

[*Official Gazette December 25, 1973.*]